United States Patent
Smith et al.

(10) Patent No.: US 10,140,641 B2
(45) Date of Patent: Nov. 27, 2018

(54) METHODS AND SYSTEMS FOR ASSISTING CUSTOMERS SHOPPING AT REAL-WORLD SHOPPING VENUES

(71) Applicant: Adobe Systems Incorporated, San Jose, CA (US)

(72) Inventors: Kevin Smith, Lehi, UT (US); Stéphane Moreau, L'Hay les Roses (FR); Sachin Soni, New Delhi (IN); Ashish Duggal, Delhi (IN); Anmol Dhawan, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 477 days.

(21) Appl. No.: 14/827,597

(22) Filed: Aug. 17, 2015

(65) Prior Publication Data
US 2017/0053330 A1     Feb. 23, 2017

(51) Int. Cl.
| | | |
|---|---|---|
| *G06Q 30/00* | (2012.01) | |
| *G06Q 30/06* | (2012.01) | |
| *H04W 4/04* | (2009.01) | |
| *H04W 4/02* | (2018.01) | |
| *G06Q 30/02* | (2012.01) | |

(52) U.S. Cl.
CPC ..... *G06Q 30/0613* (2013.01); *G06Q 30/0281* (2013.01); *G06Q 30/0639* (2013.01); *H04W 4/02* (2013.01); *H04W 4/043* (2013.01)

(58) Field of Classification Search
None
See application file for complete search history.

(56) References Cited

U.S. PATENT DOCUMENTS

| | | | | |
|---|---|---|---|---|
| 9,727,897 B2* | 8/2017 | Fonzi | .................. | G06Q 30/016 |
| 2009/0287534 A1* | 11/2009 | Guo | ....................... | G06Q 30/02 |
| | | | | 705/7.34 |
| 2014/0207614 A1* | 7/2014 | Ramaswamy | ..... | G06Q 30/0613 |
| | | | | 705/26.41 |
| 2014/0365334 A1* | 12/2014 | Hurewitz | ........... | G06Q 30/0613 |
| | | | | 705/26.41 |
| 2015/0278829 A1* | 10/2015 | Lu | ....................... | G06Q 30/0201 |
| | | | | 705/7.29 |
| 2017/0228776 A1* | 8/2017 | Walden | .............. | G06Q 30/0255 |

OTHER PUBLICATIONS

Shep Hyken, Guest Blog: Top 5 Reasons Customers Helping Customers is the Future of Customer Support, Mar. 6, 2015, https://hyken.com/customer-care/guest-blog-top-5-reasons-customers-helping-customers-is-the-future-of-customer-support/, pp. 1-3 (Year: 2015).*

* cited by examiner

*Primary Examiner* — William J Allen
*Assistant Examiner* — Maria S. P. Heath
(74) *Attorney, Agent, or Firm* — Kilpatrick Townsend & Stockton LLP (57) ABSTRACT

Systems and methods disclosed herein offer assistance to customers shopping at a real-world shopping venue carrying mobile devices connected to a communication network. This involves tracking a physical action of a customer present at the real-world shopping venue and determining to offer assistance to the customer based on the tracked physical action. Based on determining to offer assistance to the customer, a notification is sent to a mobile device of the customer. The notification identifies that live support is available to assist the customer while the customer is present at the real-world shopping venue.

20 Claims, 5 Drawing Sheets

METHODS AND SYSTEMS FOR ASSISTING CUSTOMERS SHOPPING AT REAL-WORLD SHOPPING VENUES

TECHNICAL FIELD

This disclosure relates generally to computer-implemented methods and systems and more particularly relates to improving the efficiency and effectiveness of computing systems used in providing live on-line chat and other types of customer assistance.

BACKGROUND

Providing a live expert to provide answers to online customers who are stuck, confused, or experiencing an issue on a product web page is a very important feature offered by web sites. Such answers are commonly provided in a back and forth text conversation that occurs over a live chat session initiated by the customer during the customer's online shopping experience. Live chat can provide quicker and more efficient answers to questions than telephone support. Live chat increases customer satisfaction and makes an ultimate purchase more likely. Live chat with an expert provides customers with a desired level of convenience, an opportunity for business to connect with the customer to resolve issues in real time and thus establish a better relationship with the customer, and provides an opportunity for an expert to upsell the customer on additional products or services. Similar to live chat, word of mouth marketing is another useful marketing strategy. Word of mouth recommendations are key influencers in customer purchasing decisions, and use of word of mouth as a marketing strategy has been shown to significantly improve the effectiveness of marketing efforts.

In contrast to online shopping environments, brick-and-mortar stores and other real-world shopping venues do not provide live chat and other electronic-based interactions between customers and experts and do little or nothing to facilitate customer-to-customer communications to encourage word-of-mouth type recommendations.

SUMMARY

Systems and methods disclosed herein offer assistance to customers shopping at a real-world shopping venue carrying mobile devices connected to a communication network. This involves tracking a physical action of a customer present at the real-world shopping venue and determining to offer assistance to the customer based on the tracked physical action. Based on determining to offer assistance to the customer, a notification is sent to a mobile device of the customer. The notification identifies that live support is available to assist the customer while the customer is present at the real-world shopping venue.

Another embodiment identifies support persons to provide assistance to customers shopping at a real-world shopping venue carrying mobile devices connected to a communication network. This embodiment involves tracking a physical action of a customer present at the real-world shopping venue and identifying a support person to provide assistance to the customer based on the tracked physical action. The support person and the customer are connected while the customer is present at the real-world shopping venue.

Another embodiment identifies and provides context information for support persons providing assistance to customers shopping at a real-world shopping venue carrying mobile devices connected to a communication network. This embodiment involves tracking a physical action of a customer present at the real-world shopping venue and identifying a support person to provide assistance to the customer. The support person and the customer are connected and the context information is provided to the support person based on the tracked physical action.

Another embodiment provides assistance to a customer by identifying that the customer is interested in a product or a product category. In one example, the customer's interest in the product category is identified by identifying a section of the real-world shopping venue offering the product category. The section is identified using signals emitted by a beacon in the section to determine that a mobile device of the customer is present in the section for more than a threshold period of time or that the mobile device of the customer has returned to the section after a prior visit to the section. In another example, the customer's interest in the product is identified by identifying a movement of the product by the customer based on an accelerometer attached to the product. Based on the identified product or product category, a support person is identified to provide assistance to the customer and context information to provide to the support person to provide assistance to the customer. Based on identifying that the customer is interested in the product or product category, a notification is sent to the mobile device of the customer. The notification identifies that the support person is available to assist the customer while the customer is present at the real-world shopping venue.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

As described above, in contrast to online shopping environments, brick-and-mortar stores and other real-world shopping venues do not provide live chat and other electronic-based interactions between customers and support persons and do little or nothing to facilitate customer-to-customer communications to encourage word-of-mouth type recommendations. The invention herein utilizes the electronic devices carried by customers and devices otherwise interacted with by customers while shopping in a real-world shopping venue to assist the customers. Information about a customer's physical actions in the venue (e.g., location, movement pattern, handling of particular products, etc.) is used to (a) identify those customers that may want assistance (b) select an appropriate expert as a support person to provide assistance to a particular customer; and (c) provide information about a particular customer to an assigned support person to facilitate the support person's ability to provide assistance. Assistance is provided by a remotely-located support person using electronic communication, an in-person support person who talks to the customer face-to-face, or by another customer who can provide word-of-mouth type advice through electronic or in-person communication.

One embodiment identifies that a customer may want assistance and determines to contact the customer about possible assistance based on tracking a physical action by the customer while shopping in the real-world shopping venue. The customer's action is tracked based on the customer's device or the customer's interaction with another device in the venue. For example, the location of a customer's own mobile device can be tracked to identify that the customer has spent more than 15 minutes in a particular section of the venue. Based on being in the section for beyond a 15 minute threshold, a message can be sent to the customer's mobile device asking if the customer would like live chat assistance. The customer can accept the request and live text chat through the device with a remotely-located support person. In another example, the technique identifies that the customer interacted with a particular product based on an accelerometer attached to the particular product. Based on this interaction, the system determines that the customer may want support and sends a notification asking if the customer would like live chat assistance.

Another embodiment selects an appropriate expert as a support person to provide assistance based on tracking a physical action by the customer while shopping in the real-world shopping venue. For example, the location of a customer's own mobile device can be tracked to identify that the customer walked down an aisle displaying televisions for sale more than a threshold number of times. This information can be used to identify an expert in television and related products to provide assistance to the customer. One embodiment identifies an appropriate support person using support person profiles that identify areas of expertise and/or track prior experiences with supporting customer. Support persons area of expertise information can be identified by information provided by the individual support persons, identified during performance review processes, identified based on title or role, or identified in any other appropriate way. Support person experience information can be developed based on input from the individual support persons, during performance reviews, based on feedback from customers, based on post-customer-support information logs, or in any other appropriate way. In one example, a first support person has a history of helping 150 customers with television-related questions and is 100 feet from the customer and a second support person has a history of helping only 5 customers with television-related questions is 25 feet from the customer. This information is gathered by each support person completing a quick survey following the completion of any customer support action. An algorithm is used to select a support person based on an appropriate priority, e.g., using a priority to always select an available support person with the highest experience would result in selecting the first support person while using a priority to always select the closest available support person would result in selecting the second support person. More complicated criteria can also be used, for example, selecting an available support person with the highest level of experience within 100 feet of the customer.

Another embodiment provides information about a particular customer to an assigned support person to facilitate the support person's ability to provide assistance. This involves passing highly relevant context information (based on past/current offline in-store activity and/or online activity) to the support person. This information can help the support person answer the customer's questions, pitch a product in a more convincing manner to increase the chances of conversion, and enable the support person to up-sell and cross-sell related products to the customer. For example, context information may identify all products that the customer picked up while in the venue, the sections that the customer visited, and the time spent in each section. As a specific example, the support person may be able to identify that the customer is debating between two particular products based on the customer having interacted with each of those two products more times than other products.

Numerous benefits are provided by the techniques disclosed herein. By automatically determining if a customer who is already in a real-world shopping venue requires help, connecting an appropriate remote or in-store support person, and facilitating the support person with context information, the customer's shopping experience is improved, the likelihood of a purchase is increased, and cross-selling and up-selling opportunities are improved.

The information about a customer's physical actions while in a real-world shopping venue can also provide valuable brand interest information. The system is able to identify products of a given brand that are of interest to a customer based on the customer's actions. This information is provided to the support person to help the support person pitch and sell particular products and services. In addition, the system can optimize which support person is connected to provide assistance to both provide the best support and pitch products related to the customer's interests. For example, if a customer spent a significant amount of time in the camera section and then came to Samsung® mobile section, the system may connect the customer with a Samsung® product expert who also has expertise in cameras.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "customer" refers to any person that shops for, browses, buys, rents, or uses goods or services offered at a real-world shopping venue.

As used herein, the phrase "real-world shopping venue" refers to a physical location where products or services are offered to customers. A customer present at a real-world shopping venue is at the real-world shopping venue in person. For example, a person walking through the aisles of a store is present at a real-world shopping venue. As another example, a person testing items in an outdoor market is present at a real-world shopping venue. Online stores are not real-world shopping venues. Thus, a person using a desktop computer at the person's residence to shop for products by accessing a webpage is not present in real-world shopping venue.

As used herein, the phrase "mobile device" refers to a portable electronic computing device such as a smartphone, tablet, laptop, watch, wearable electronic device, and other similar devices.

As used herein, the phrase "physical action" refers to any activity performed by a person in the real-world that results in the person or an object moving, bending, stretching, shifting, leaning, rotating, or remaining in a location, excluding activities that provide input to or control electronic device user interfaces. Examples of physical actions include, but are not limited to, standing or sitting in a location for a period of time, moving from one location to another location, moving in a pattern, picking up a product, handling a product for a period of time, entering a real-world shopping venue, remaining in a real-world shopping venue for a period of time, leaving a real-world shopping venue, entering a section of a real-world shopping venue, leaving a section of a real-world shopping venue, and remaining in a section of a real-world shopping venue for a period of time. Interactions to provide input or control electronic device user interfaces (e.g., via keyboard, mouse, voice command, etc.) are not physical actions for purposes of this patent. Accordingly, sending an e-mail, making an online purchase, and other such computing actions are not physical actions.

As used herein, the phrase "live support" refers to assistance provided by a support person in real time. Live chat through electronic devices connected through a network is one example of live support. In-person conversation is another example of live support. Text messaging back and forth between a support person and a customer is another example of live support. A phone call between a support person and a customer is yet another example of live support.

As used herein the phrase "support person" refers to any person who provides assistance, product information, sales information, marketing information, personal recommendations, or other information to a customer. Support persons include persons affiliated with the organization providing the real-world shopping venue (e.g., store employees), persons affiliated with an organization offering a particular product brand (e.g., Brand X employees), other customers (e.g., to provide word-of-mouth type advice), and other persons who provide assistance. Thus, an employee of an organization offering products and services in a real-world shopping venue who provides assistance to a customer of the real-world shopping venue is a support person. Another customer, who is not an employee of the organization, who provides advice, recommendations, or other assistance to the customer is also an example of a support person.

Figure 1:
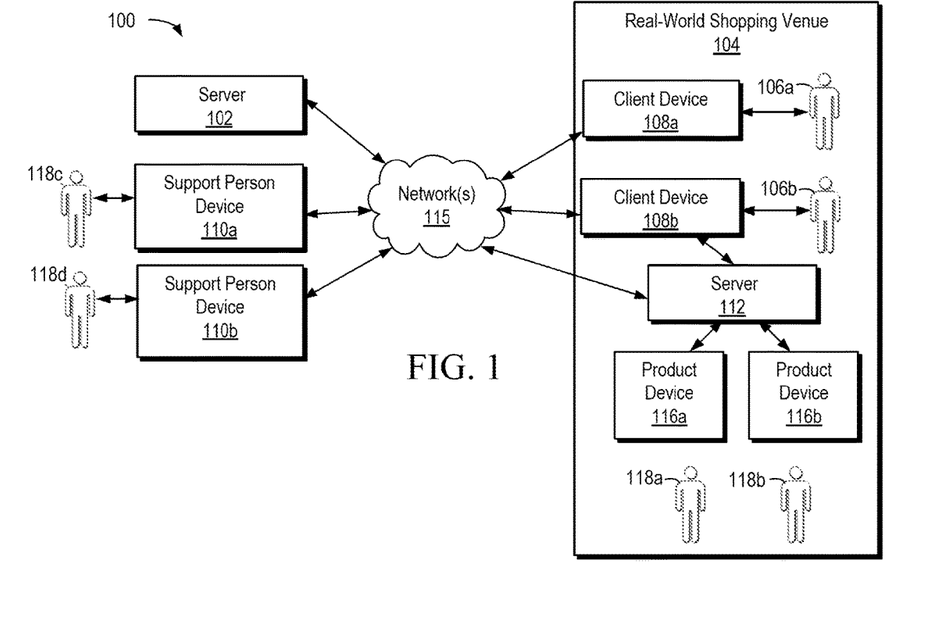
FIG. 1 is a block diagram depicting an example of a system for assisting customers shopping at real-world shopping venues while carrying or interacting with electronic devices.

Referring now to the drawings, FIG. 1 is a block diagram depicting an example of a system for assisting customers shopping at real-world shopping venues while carrying or interacting with electronic devices. In one example, determinations made by server 102 are used to provide assistance in the real-world shopping venue 104. Individuals 106a-b use client devices 108a-b while shopping in the real-world shopping venue 104. The individuals 106a-b also interact with products that are attached to product devices 116a-b. The physical actions of individuals are tracked by monitoring the locations and uses of client devices 108a-b and product devices 116a-b. For example, local server 112 can receive information from product devices 116a-b through a wireless network when identifying when the product devices 116a and 116b are picked up. The location of the individuals 106a-b can be determined based on client devices 108a and 108b. The physical actions of individuals in a real-world shopping venue can be tracked in additional and alternative ways.

Information about the physical actions of the individuals 106a-b is provided to server 102 through network 115. Server 102 uses the information about the physical actions to make determinations to facilitate providing assistance to the individuals 106a-b. For example, server 102 may determine to offer individual 106a assistance based on individual 106a remaining in a particular section of a store for more than 20 minutes (or any other appropriate time threshold). As another example, server 102 may determine to offer individual 106b assistance with respect to large screen televisions based on the individual's 106b location and assign an appropriate support person, from the group of support persons 118a-d, to provide support. For example, support person 118a has more experience with large television technology and products and is assigned to provide assistance with customer 106b based on this expertise.

In FIG. 1, support persons 118a-b are located within the real-world shopping venue and thus can provide in-person support to customers 106a-b. Support persons 118c-d are located remote from the real-world shopping venue and thus provide support using support person devices 110a-b to communicate through network 115 with customers 106a-b using client devices 108a-b. As non-limiting examples, support persons 118c-d provide live support to customers 106a-b using live chat, text messages, e-mail messages, audio messages, and/or phone calls.

Figure 2:
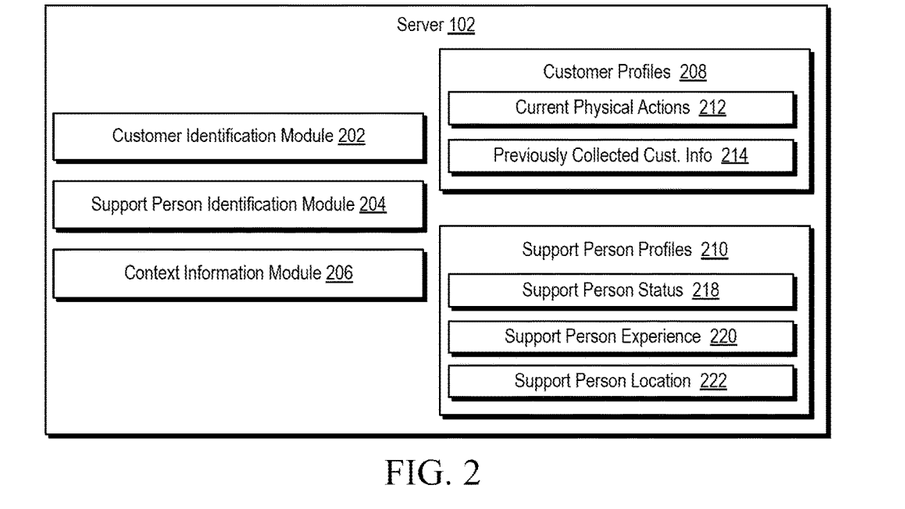
FIG. 2 is a block diagram illustrating exemplary modules for implementing functions in the server of FIG. 1.

FIG. 2 is a block diagram illustrating exemplary modules for implementing customer assistance functions in server 102 of FIG. 1. Similar modules could additionally or alternatively be used in the server 112 of FIG. 1, local to the real-world shopping venue, or on any other appropriate device or devices and at any appropriate location or locations. The server 102 includes modules 202, 204, and 206, which each are implemented by a processor executing stored computer instructions.

The customer identification module 202 comprises instructions that, when executed by a processor, use information about a customer's current physical actions 212 and/or previously collected customer information 214 from customer profiles 208 to determine to offer assistance to customers. This can involve identifying that a customer is at a location for more than a threshold amount of time, that the customer's pattern of movement has characteristics of a person wanting assistance, that the customer has picked up at least a threshold number of one type of product, that the customer has picked up a particular product multiple times or for at least a threshold amount of time, etc. The customer's current physical actions 212 are the physical actions tracked during the customer's current shopping experience in the real-world shopping venue. After the customer's shopping experience, this information is analyzed and/or added to the customer's profile 208, for example, being compiled into information stored in the previously collected customer information 214 of the customer profiles 208.

The support person identification module 204 comprises instructions that, when executed by a processor, use information about a customer's current physical actions 212, previously collected customer information 214, and/or support person profiles 210, to determine an appropriate support person to provide assistance to a customer. Support person identification module 204 can select a support person based on support person status 218 (busy, idle, etc.), support person experience 220, support person location 222, the support person's prior interaction with the particular customer, and/or any other criteria or combination of criteria. A support person can additionally or alternatively be selected based on information received from a customer, e.g., using customer preference information stored in customer profiles 208 or information received from the customer during the customer's current shopping experience at the real-world shopping venue.

In one specific example, a customer's current physical actions 212 while in a venue are used to conclude that the customer is interested in computer printers. The previously collected customer information 214 is used to determine that the customer purchased a Brand X desktop computer 6 months ago, purchased a Brand Y printer 5 years ago, and that the customer's shopping and browsing history indicates an interest in Brand X, Brand Y, and Brand Z products. This information is used with the support person profiles 210 to identify an appropriate (or best fitting) support person. In this example, a support person affiliated with Brand Y (and unaffiliated with the organization providing the real-world shopping venue) is selected to provide assistance to the customer. In another example, support person identification module 204 selects several appropriate support persons and sends a notification to the customer to offer support from a customer selected person (e.g., "Press 1 to live chat with an in-store advisor, Press 2 to live chat with a Brand X advisor, Press 3 to live chat with another customer who recommends Brand X printer model T . . . ")

The support person profiles 210 include support person experience 220 identifying the amount of experience each support person has with respect to particular types and brands of products and services. Such experience can be collected over time, for example, as each particular support person acquires new experiences and as new products and brands are released. In one embodiment, a support person's profile is created based on the support person agreeing to provide support services. The support person completes a personal information input form that identifies technologies, products, services, brands, and other items that the support person has experience with or interest in. As the support person provides support, instances of support are tracked by the support person, customers, and/or others. This information is used to supplement the support person's profile.

Items of experience in a support person's profile may be associated with one another or organized within a framework such as a hierarchy to support identification of appropriate support persons for customer needs. In one example, experience with individual brands is associated with experience with individual product types, and ultimately associated with product categories. Expertise and experiences can thus be tracked and used at differing levels of granularity from specific models of specific brands of specific products to general product/service types.

The launch of a new product or service being launched is addressed in various ways. In one embodiment, a new product or service from a new brand comes in the market and a new support person profile or profile record is created and experience is simply added over time as the support person provides assistance or otherwise gains experience with the new product or service. In other embodiments, support person profiles or profile records for new products and services are created to identify learning experiences of the support persons with respect to the new products and services, e.g., based on taking information tests, based on proof of evaluating product information, or based on other criteria used to confirm that the support person has been exposed to information about the new product or service. In another example, new products and services are classified in a category or in a hierarchical organization structure to be associated with most similar products and product types. For example, when a new wearable anklet electronic device is introduced, the device may be placed in a category with other wearable electronic devices, such as watch type computing devices, eye-glasses with computing devices, etc. Initially, until support persons develop specific experience with the particular models, brands, product, product type, etc., support persons with experiences in related items are identified. Eventually, specific experience develops with the new products and more specific criteria can be used to select the support persons. In the above example, at first watch experts are identified but eventually experts gain enough experience with anklets that anklet experts can be directly identified.

The support person profiles 210 also includes support person status 218 providing information about each support person's availability. For example, this identifies whether a remote support person is currently helping another customer. As another example, support person profiles 210 include a task that an in-store support person is engaged in, which is used to determine whether the task can be interrupted to provide support to the customer.

The support person profiles 210 also include a support person location 222. For example, the support person location 222 may identify that the support person's current location within the real-world shopping venue is within a threshold distance of a customer requiring assistance.

Server 102, in FIG. 2, also includes a context information module 206. Context information module 206 identifies context information for support persons who will or are providing assistance to customers shopping at a real-world shopping venue. The context information module 206 comprises instructions that, when executed by a processor, use information about a customer's current physical actions 212 and/or previously collected customer information 214 from customer profiles 208 to provide useful context information to the support person. For example, a report sent to the support person before or during a live chat with the customer identifies that the customer's physical actions 212 while in the real-world shopping venue show that the customer is interested in printers and that previously collected customer information shows that the customer purchased a Brand X desktop computer 6 months ago, purchased a Brand Y printer 5 years ago, and that the customer's shopping and browsing history indicates an interest in Brand X, Brand Y, and Brand Z products. This support person is able to provide more informed assistance to the customer based on this information. The support person is also able to better sell products and services that the customer is interested in, as well as cross sell additional products and services.

Figure 3:
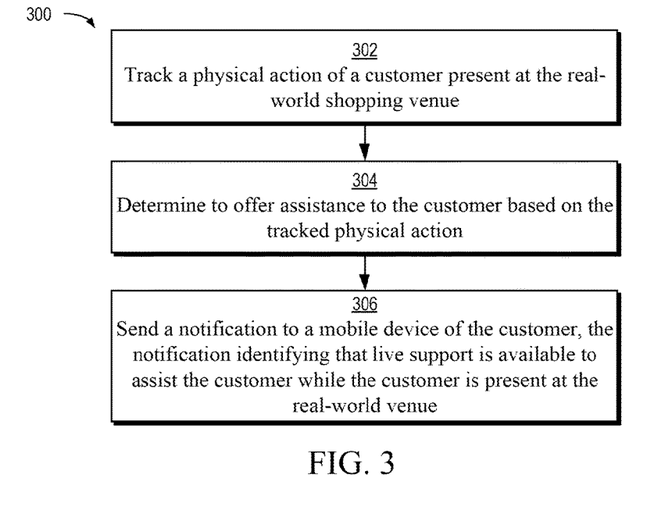
FIG. 3 is a flow chart of an exemplary method for offering assistance to customers shopping at a real-world shopping venue carrying mobile devices connected to a communication network.

FIG. 3 is a flow chart of an exemplary method 300 for offering assistance to customers shopping at a real-world shopping venue carrying mobile devices connected to a communication network. The exemplary method 300 is performed by a processor of a computer device executing instructions to perform one or more of the following operations.

Method 300 involves tracking a physical action of a customer present at the real-world shopping venue, as shown in block 302, and determining to offer assistance to the customer based on the tracked physical action, as shown in block 304. Tracking the physical action, in one embodiment, involves determining that the customer spent more than a threshold amount of time at a particular location or section within the real-world shopping venue. For example, the floorplan of a real-world shopping venue may be segmented into sections, which may have similar or differing sizes. In one embodiment, sections are selected to correspond to particular product types and/or brands. The customer's location can be tracked relative to these sections. For example, the customer's location can be tracked to identify that the customer is moving out of a particular section of the real-world shopping venue to offer the customer assistance as he or she is leaving the section.

Figure 4:
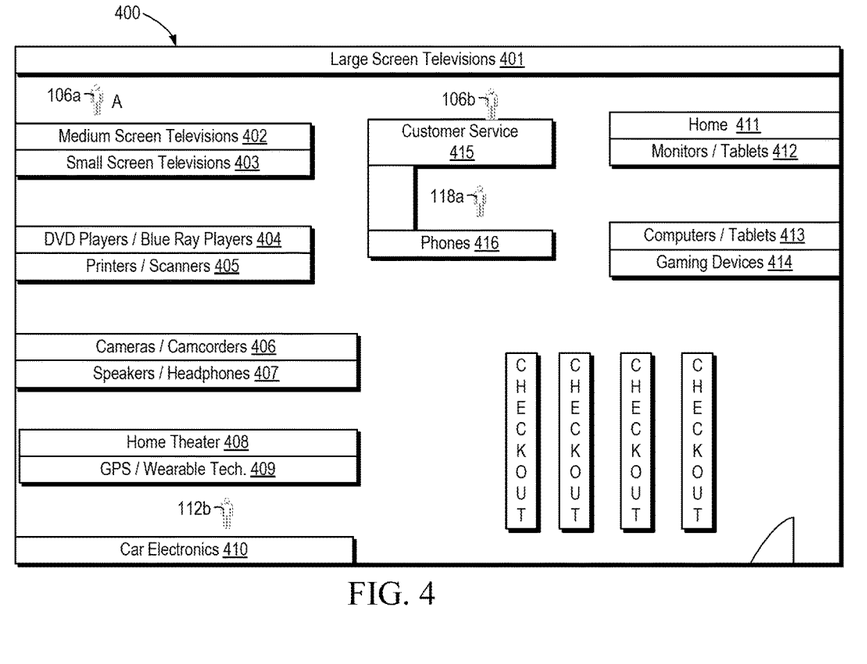
FIG. 4 is a floor plan illustrating an example physical action within a real-world shopping venue used to determine to offer assistance to a customer.

FIG. 4 is a floor plan 400 illustrating an example physical action within a real-world shopping venue used to determine to offer assistance to a customer. The floor plan 400 includes shelves and displays that offer various products: large screen televisions 401, medium screen televisions 402, small screen televisions 403, DVD players and blue ray players 404, printers and scanners 405, cameras and camcorders 406, speakers and headphones 407, home theater 408, GPS and wearable technologies 409, car electronics 410, home technology 411, monitors and tablets 412, computers and tablets 413, gaming devices 414, and phones 416.

A customer service support person 118a stands behind a customer service counter 415 helping a customer 106b. In this example the customer 106a spends 5 minutes at location A in an aisle between large screen televisions 401 and medium screen televisions 402. The customer 106a does not ask customer service support person 118a because customer service support person 118a is busy helping customer 106b. Whether a customer support person is busy can be determined based on a status indicator controlled by the support person, based on the analysis of the support person's and/or nearby customer's physical actions, or determined in any other appropriate way. In one example, if two support persons are the same distance from a customer for more than a threshold amount of time, the system sends notifications to the support persons' devices asking which of them is helping the customer. In another example, the system detects body orientation of a customer, e.g., using images from an in-store video camera, to determine which direction the person is facing and determines whether one or both of the nearby support persons' are helping the customer based on the where the customer is facing.

In the example of FIG. 4, based on the customer 106a spending more than a threshold amount of time (e.g., 4 minutes) in a particular location, the system determines to offer the customer 106a assistance. In this example, the system further determines that no support person is within a threshold distance of the customer 106a and basis the determination to offer assistance on this additional inference. Additional or alternative criteria can be used to determine whether to offer the customer 106a assistance.

The customer location may be determined by a beacon, e.g., a device positioned in a fixed location within a venue that broadcasts its location to nearby portable electronic devices. When a customer is in range of a beacon, the customer's electronic device receives the beacon's location and provides the location information to a server or other collection point. In one example, a beacon is placed in a particular section of the store to identify when the customer is in that section of the store.

In another embodiment, radio frequency identification (RFID) or near field communication (NFC) is used to determine the location of customer. A customer can carry an electronic device with an RFID tag or an RFID reader that interacts with RFID tags and/or RFID readers in the venue to determine location.

Beacon tags, RFID devices, and NFC devices can be enhanced with accelerometers to provide additional information about a customer's physical actions. For example, a beacon with an accelerometer is positioned on a sample product and used to determine both how long the customer is in the section and that the customer lifted the sample product.

Figure 5:
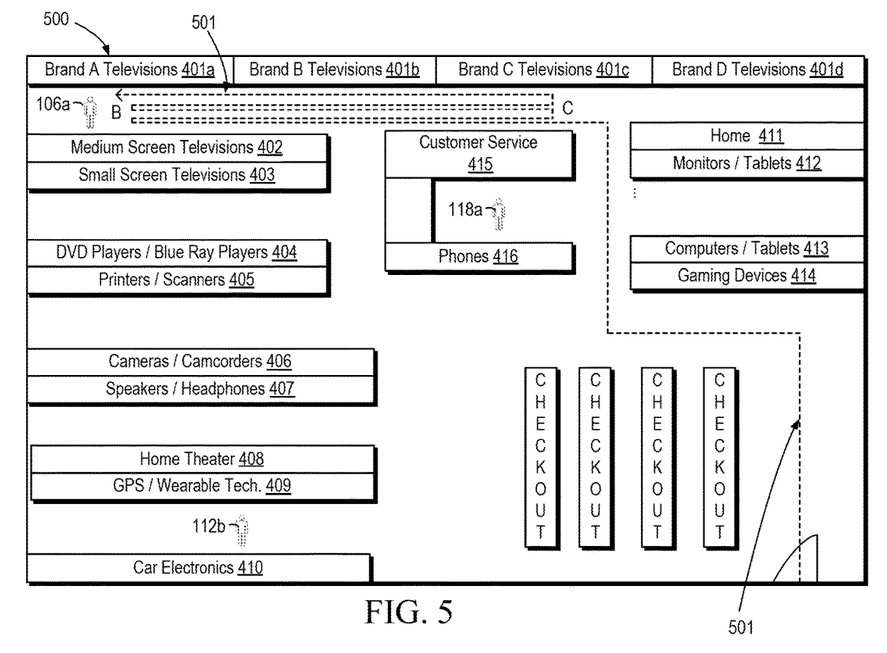
FIG. 5 is a floor plan illustrating another example physical action, within the real-world shopping venue of FIG. 4, used to determine to offer assistance to a customer.

FIG. 5 is a floor plan 500 illustrating another example physical action within a real-world shopping venue used to determine to offer assistance to a customer. The floor plan 500 includes shelves and displays that offer various products similar to the floor plan 400 of FIG. 4. In this example, the customer 106a moves in the pattern represented by arrow 501 after entering the store. Characteristics of the pattern 501 are used to identify whether to offer assistance to the customer. Specifically, in this example, the customer's 106a movement back and forth between two positions B and C is used to identify that the customer is comparing two products, one product at position B and one product at position C. A threshold number of back and forth movements can be used, e.g., 2, 3, etc., to determine whether a customer is comparing products, looking for something without finding it, etc.

Other types of movement patterns can also be used, such as walking in a loop, returning to a same point over and over, a movement to a help desk, a movement towards an employee with another customer followed by a movement back to product area or section, or making one or more recurring visits to a particular location or section of the real-world shopping venue. In addition, movement patterns can be learned. For example, the system may track movements and subsequent customer requests for assistance to learn patterns of movement that are frequently followed by requests for assistance. Once learned, the system can identify similar movement patterns as they occur and offer assistance to the customer based on recognizing the similar movement pattern.

Tracking the physical action can additionally or alternatively involve identifying that the customer interacted with a particular product based on an accelerometer attached to the particular product. For example, the customer may pick up a box with a tablet inside to read information about the tablet. The system may detect this action by detecting a movement of an accelerometer attached to the box of the tablet. One or more occurrences of a customer interacting with a particular product or products can trigger an offer for assistance. In one example, detecting that a customer picks up and inspects both a Brand X tablet and a Brand Y tablet triggers an offer for assistance. In another example, one or more occurrences of a customer interacting with a particular product or category of product triggers an offer for assistance.

Determining to offer assistance, in one embodiment, is further based on prior actions of the customer in the real-world shopping venue. For example, prior actions of the customer in the venue on other recent occasions may be used to determine to offer the assistance to the customer. In one specific example, the customer is offered assistance if he or she shops in a same section of a store at least three times in one month. In other embodiments, determining to offer assistance is based on a customer location or activity determined based on interpreting images from a camera or video camera, information from an Internet of Things-type sensor, information from a beacon, information from a Radio Frequency Identification (RFID) chip; or previous online interactions, etc.

The method 300, in one embodiment, also involves identifying a support person to provide assistance based on the tracked physical action or a user profile associated with the customer.

Returning to FIG. 3, method 300 further involves sending a notification to a mobile device of the customer, the notification identifying that live support is available to assist the customer while the customer is present at the real-world shopping venue, as shown in block 306. A support person is connected to the customer to provide assistance while the customer is present at the real-world shopping venue. In one embodiment, context information about the tracked physical action is provided to the support person.

A notification sent to a customer offering assistance can be sent using a variety of communication techniques. One embodiment sends the customer an e-mail or text message that assistance is available. In another example, a customer's device includes an application specific to the retailer, publisher, or brand and push notifications are sent to the customer through the application offering assistance to the customer. An example notification asks "Your activity indicates that you are shopping, would you like to get connected with a remote support person, an in-store sales associate, or an in-store expert consumer for assistance or recommendations?"

In one example, when a customer receives an offer for assistance and selects to receive assistance, a marketer, publisher, or brand-specific application on the customer's mobile devices opens and provides options to the customer. An example of a notification presenting options reads "(1) Get connected with a remote support person or (2) Get connected with an in-store expert consumer." One embodiment involves the application also showing a prioritized list of products to the customer. The prioritized list is determined based on one or more of various factors. A first factor involves products explored by the customer while at the real-world shopping venue, e.g., as ascertained by beacon tags, RFID tags, NFC tags, accelerometers, etc. A second factor is the sales history of products in the customer's current section, e.g., prioritizing the bestselling products from the section. A third factor is the customer's profile. For example, if the customer has a high income and a history of purchasing high end products, products in higher price ranges are prioritized.

If the customer selects the first option (i.e., connect with a remote support person), various features can be provided. A first exemplary feature provides a push notification to an appropriate support person who connects with the customer. When the support person clicks on the push notification he or she is provided with context information to help assist, convert, up-sell, and cross-sell the customer. If a support person and a customer are connected in a live chat session, a chat window is opened in apps. on devices of both the support person and the customer so that the support person can assist the prospect with his or her queries and convert, up-sell, and cross-sell products to the customer.

If the customer selects the second option (i.e., connect with an in-store expert consumer), an appropriate expert consumer is selected and connected with the customer. In one embodiment, from all of the expert consumers who have given their consent to help other customers on the particular product or category, the system selects a best (or a threshold number of best) experts for the particular circumstances. The experts can be selected based on a score determined using the experts' past conversion rates (C) and/or the experts' distances (D) from the section where the customer is present. A weighted customer support score can be determined using the equation $W1*D+W2*C$, where W1 (Default Value: 0.5) and W2 (Default Value: 0.5) are weights that can optionally be specified by the marketer. The system will then send a push notification to the expert consumer with the highest score. The expert consumer clicks on this push notification, which will open the marketer's application where the expert consumer can be provided with the information about the section where the customer is present so that he can move to that section to help convert the customer. If the push notification is not opened in a threshold amount of time by the customer, the system sends another push notification to the next best expert consumer and so on.

Feedback regarding the assistance provided by a support person may be collected in various ways. In one embodiment, a customer provides feedback via the customer's electronic device. For example, the customer may provide a 0-10 rating following a live chat session or following an in-person conversation. Providing such feedback following an in-person conversation provides a new avenue for collecting feedback regarding in-store employee performance and can provide information used to provide a bonus, commission, or enhanced compensation to in-store employees who perform well. In another embodiment, in-store employees and online support persons are enabled to provide information about assistance provided to a customer. This allows the support person to add to the information known about a customer to enhance the customer's profile. This provides a new way to collect information about customers from in-store employees. The identity of the customer can be based on tracking the customer's electronic device, based on information received from the customer, or determined in any other appropriate way.

Figure 6:
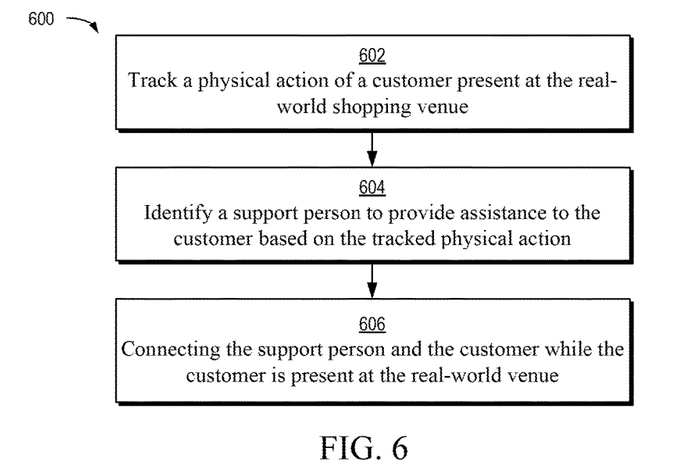
FIG. 6 is a flow chart of an exemplary method for identifying support persons to provide assistance to customers shopping at a real-world shopping venue carrying mobile devices connected to a communication network.

FIG. 6 is a flow chart of an exemplary method 600 for identifying support persons to provide assistance to customers shopping at a real-world shopping venue carrying mobile devices connected to a communication network. The exemplary method 600 is performed by a processor of a computer device executing instructions to perform one or more of the following operations.

Method 600 involves tracking a physical action of a customer present at the real-world shopping venue, as shown in block 602. This can involve similar tracking as performed in block 302 of FIG. 3.

Method 600 further involves identifying a support person to provide assistance to the customer based on the tracked physical action, as shown in block 604. In one embodiment, identifying the support person involves identifying which of a plurality of support persons will provide in-person contact based on locations associated with each of the plurality of support persons. For example, if three in-store associates are available to provide assistance, the closest in-store associate to the customer may be selected to provide assistance and contacted via the in-store associates electronic device or over an intercom system to meet the customer at the customer's current location.

In another embodiment, identifying the support person involves identifying an area of expertise based on the tracked physical action and identifying the support person based on experience of the support person in the area of expertise. For example, if the customer's tracked physical action is standing in front of annual flowers in a garden store, the system will identify an annual flower expert as the support person and connect the expert with the customer.

Identifying the support person, in another embodiment, involves identifying a type of product and/or brands of interest based on the customer interacting with a product of the type while in the real-world shopping venue and identifying the support person based on experience of the support person with the type of product. For example, if the customer's tracked physical action is picking up several brands of audio speakers, the system will identify an audio speaker expert familiar with the brands and connect the audio speaker expert with the customer.

Identifying the support person, in one embodiment, is based on information about online interactions of the customer and actions of the customer in the real-world shopping venue. For example, a customer's user profile may include information about online purchases showing a preference towards particular brand and the customer's in-store activity may show an interest in another brand. In such a circumstance, the system may identify a support person with experience in both brands and provide the support person with appropriate context information, e.g., identifying the prior online interactions and in-store actions, so that the support person can better address the customer. For example, the support person may compare the brands and discuss why other customers have switched from the first brand to the second brand.

In another embodiment, identifying the support person involves identifying another customer to provide assistance, i.e., a support customer. Such a support customer will generally have previously consented to provide support. In one embodiment, a support customer is provided an incentive, such as a payment, reward points, a discount, or status, in exchange for providing the assistance.

Method 600 further involves connecting the support person and the customer while the customer is present at the real-world shopping venue, as shown in block 606. In one embodiment, connecting the support person involves connecting the support person in a live chat session to the customer on a mobile device of the customer while the customer is present at the real-world shopping venue. In another embodiment, connecting the support person involves initiating in-person contact between the support person and the customer. In another embodiment, connecting the support person involves connecting the customer and another customer, i.e., to a support customer. Context information based on the tracked physical action, in one embodiment, is provided to the support person providing assistance.

Embodiments provide support persons in various circumstances. In one embodiment, the customer requests advice, for example, by using his or her mobile device. In this example, the support person is connected with the customer in response to a request initiated on a mobile device of the customer. In another embodiment, the system determines to offer assistance to the customer and the customer and support person are connected based on the customer accepting the assistance. In another embodiment, the system offers various types of assistance (in-person, live chat, peer recommendations from a support customer, etc.) that the customer selects from to receive assistance.

Figure 7:
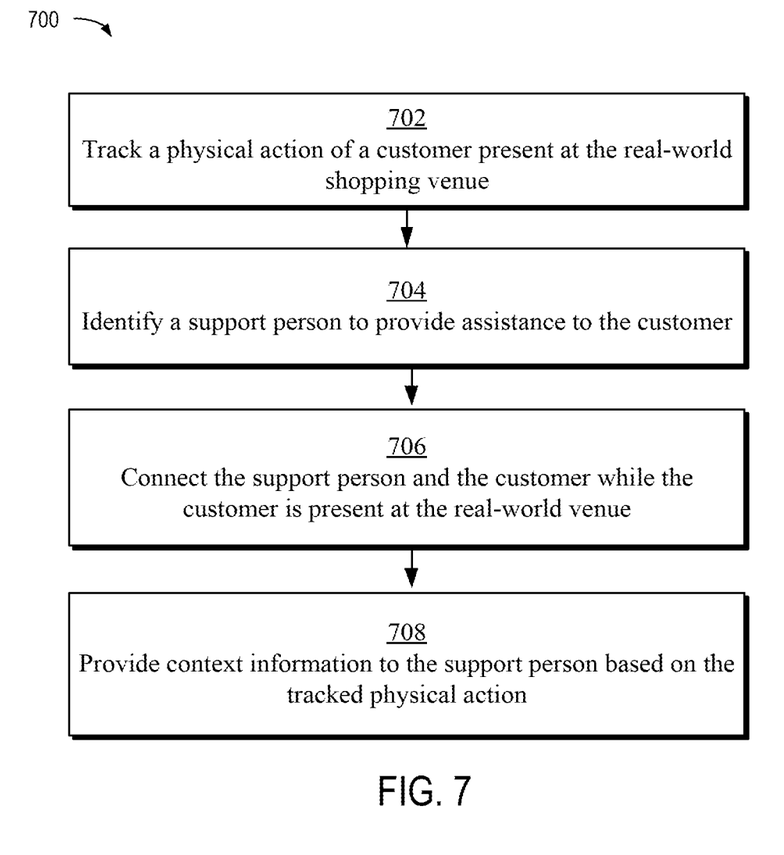
FIG. 7 is a flow chart of an exemplary method for identifying context information for support persons providing assistance to customers shopping at a real-world shopping venue carrying mobile devices connected to a communication network.

FIG. 7 is a flow chart of an exemplary method 700 for identifying context information for support persons providing assistance to customers shopping at a real-world shopping venue carrying mobile devices connected to a communication network. The exemplary method 700 is performed by a processor of a computer device executing instructions to perform one or more of the following operations.

Method 700 involves tracking a physical action of a customer present at the real-world shopping venue, as shown in block 702. This can involve similar tracking as performed in block 302 of FIG. 3.

Method 700 further involves identifying a support person to provide assistance to the customer, as shown in block 704. This can involve identifying a support person in a similar fashion as performed in block 604 of FIG. 6. The support person need not be selected based on the tracked physical action but instead may be selected based on availability, at random, or based on other criteria.

Method 700 further involves connecting the support person and the customer while the customer is present at the real-world shopping venue, as shown in block 706, and providing context information to the support person based on the tracked physical action, as shown in block 708. The context information can include the section where the customer is present or identify the product or type of product in which the customer is interested. In one embodiment, the context information identifies products that the customer interacted with while in the real-world shopping venue.

In another embodiment, the context information identifies a section of the real-world shopping venue where the customer is present. In another embodiment, the context information identifies a related section of the real-world shopping venue that the customer previously visited. For example, where a customer visited the camera section for some time before coming to the mobile section, a support person connected with the customer to assist him with Brand X mobile devices may highlight the fact that cameras on Brand X phones are "just awesome," etc.

The context information can include information about competitor brands that the customer has visited. For example, if a customer has visited Brand Y laptop section for a few minutes and a support person is connected with respect to Brand Z laptops, a support person provided by Brand Z can compare Brand Z laptops to Brand Y laptops, and explain the ways Brand Z is better.

The context information can also include cross-selling information. For example, if the customer visited a printer section before visiting the laptop section, the support person can mention the advantages to buying a printer along with a new laptop.

The context information can also include information about features of the product or category of interest to the customer. Such interest, in one example, is determined based on additional tracking technologies. For example, eye tracking technology can be used to determine that a customer prioritizes the camera and screen characteristics of a mobile phone product.

Embodiments disclosed herein provide numerous advantages. From the customer's perspective, the customer's experience is more efficient, more productive, and less frustrating, and often more enjoyable. From the merchant's perspective, the customer is more likely to purchase products and services, more likely to be cross-sold on additional products and services, more likely to have a favorable opinion of the shopping experience and merchant brand, and more likely to be a repeat customer in the future.

The following exemplary use cases are provided to illustrate one or more of the advantages of certain embodiments of providing assistance through an application that a customer installs on the customer's mobile device.

In one example, a consumer electronics retailer installs beacons in all of the major sections of a store and push notifications are sent to customers offering assistance using the retailer's app installed on the customer's device.

In another example, a network company having a partnership with a retailer, installs beacons in various sections of the retailer's store and charges a fee for setting up and maintaining the beacon network. In turn, this company provides store analytics data and facilitates the retailer sending push notifications to in-store customers. In this case, the customer in the store does not need to have the retailer's app. The network company can use a more generic app., for example, one or more apps. provided by major publishers so that any visitor having one of these apps. can be tracked and targeted with notifications offering assistance.

In another example, a particular product brand (e.g., Brand X) ships its products with RFID, NFC, or other tracking components and it is the organization associated with Brand X, rather than the retailer or network company, that offers assistance to customers in the real-world shopping venue based on interaction with the Brand's products.

In another example, a third party that is neither the retailer, brand owner, or network company, provides the app. In this way, a single app. (unaffiliated with particular retailers and brands) is used to provide assistance to customers in multiple stores and for multiple product brands. The third party can employ product experts that are available to provide assistance or connect support persons from the particular retailers, brands, or other sources.

Exemplary Computing Environment

Figure 8:
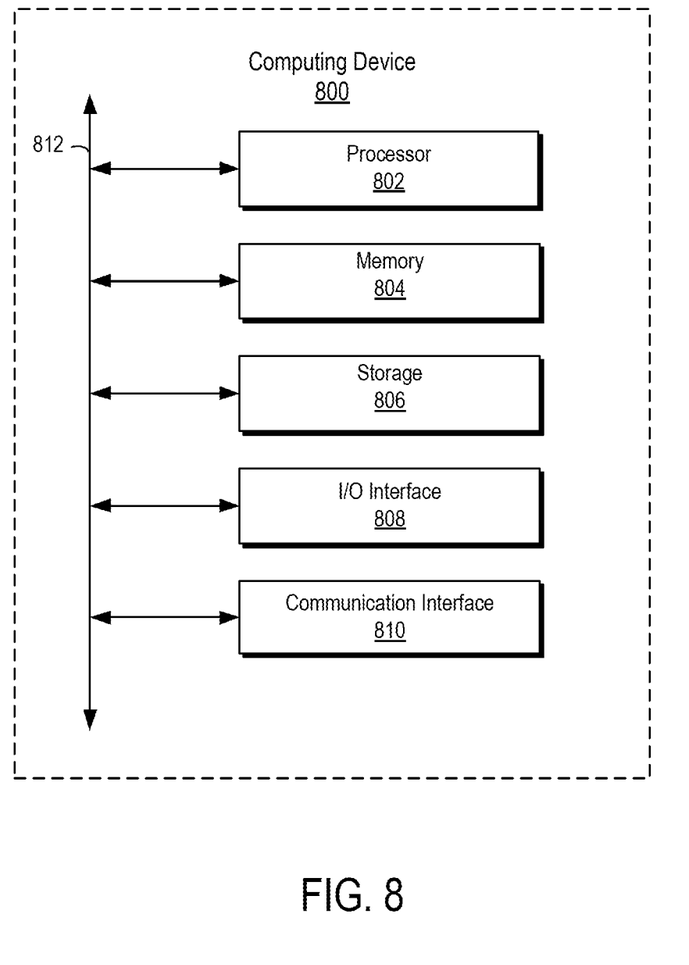
FIG. 8 is a block diagram depicting example hardware implementations for the components described in FIG. 1.

Any suitable computing system or group of computing systems can be used to implement the computer devices of FIG. 1 or otherwise used to implement the techniques and methods disclosed herein. For example, FIG. 8 is a block diagram depicting examples of implementations of such components. The computing device 800 can include a processor 802 that is communicatively coupled to a memory 804 and that executes computer-executable program code and/or accesses information stored in the memory 804 or storage 806. The processor 802 may comprise a microprocessor, an application-specific integrated circuit ("ASIC"), a state machine, or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more of the modules of FIG. 2. The program code may be resident in the memory 804, storage 806, or any suitable computer-readable medium and may be executed by the processor 802 or any other suitable processor. In some embodiments, modules can be resident in the memory 804. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for identifying support persons to provide assistance to customers shopping at a real-world shopping venue carrying customer mobile devices connected to a communication network, the method comprising:
   tracking, by a processing device, a physical action of a customer present at the real-world shopping venue, wherein the physical action is not an activity that causes the customer to interact with an electronic device user interface, wherein tracking the physical action comprises:
      communicating with a sensor positioned within a location of the real-world shopping venue, wherein the sensor wirelessly communicates with a customer mobile device of the customer,
      obtaining, via the communications between the processing device and the sensor, data indicating one or more of (i) the customer mobile device having communicated with the sensor at a first time and a second time and (ii) movement of an object within the location, and
      determining that the physical action occurred based on one or more of (i) the first time and the second time indicating a threshold duration of the customer mobile device being positioned at the location and (ii) the movement of the object within the location;
   identifying, by the processing device, a support person to provide assistance to the customer based on the tracked physical action and the location of the support person, wherein identifying the support person comprises:
      accessing a data structure that associates mobile devices of support personnel with locations within the real-world shopping venue,
      matching the location to one of the locations in the data structure, and
      outputting an identifier of the support person based on the matching,
   determining, by the processing device, that the support person from the outputted identifier is an additional customer having a support mobile device that is present at the real-world shopping venue who has consented to provide support in exchange for an incentive;
   configuring, while the customer mobile device is in the location, the customer mobile device to display an interface prompting for authorization to contact the support person; and
   configuring, responsive to receiving the authorization via the interface, a telecommunication server to transmit, to the support mobile device of the support person, a notification having information about the location of the customer within the real-world shopping venue.

2. The method of claim 1, further comprising configuring, responsive to receiving the authorization via the interface, the interface on the support mobile device and on the customer mobile device in order to initiate a live chat between the support person and the customer.

3. The method of claim 1, wherein the sensor positioned within the location the real-world shopping venue comprises a beacon, Radio Frequency Identification (RFID) device, or Near Field Communication (NFC) device,
   wherein the processing device determines a customer location by selecting, as the customer location, a location of the beacon, RFID device, or NFC device during communication with the customer mobile device.

4. The method of claim 1, wherein the sensor comprises an accelerometer and a beacon positioned on a particular product, wherein tracking the physical action further comprises:
   determining, from communications with the beacon at the first time and the second time, that the customer mobile device is in the location for a threshold amount of time;
   determining, movement data generated by the accelerometer, a movement of the particular product in the location, wherein the processing device obtains the movement data via wireless communication with the accelerometer; and
   attributing, by the processing device, the physical action involving interaction the particular product to the customer based on the movement data indicating the movement of the particular product during a time period in which the customer is determined to be in the location.

5. The method of claim 1, wherein identifying the support person comprises:
   identifying an area of expertise based on the tracked physical action;
   accessing a data structure containing associations between one or more potential support persons and one or more areas of expertise; and
   determining that the support person is associated with the area of expertise based on the tracked physical action.

6. The method of claim 1, further comprising:
   configuring, responsive to receiving the authorization via the interface, a telecommunication server to transmit, to the support mobile device of the support person, context information comprising information about online interactions and information about customer actions in the real-world shopping venue.

7. The method of claim 6, wherein the context information identifies one or more of:
   a section of the real-world shopping venue where the customer is present;
   a related section of the real-world shopping venue that the customer previously visited;
   a competitor brand of a product that the customer interacted with at the real-world shopping venue;
   cross selling information; or
   features of a product or category in which the customer is determined to be interested based on an eye tracking sensor.

8. A system comprising:
   a processing device; and
   a non-transitory computer-readable medium communicatively coupled to the processing device, wherein the processing device is configured to execute program code stored in the non-transitory computer-readable medium and thereby perform operations comprising:
      tracking a physical action of a customer present at a real-world shopping venue, wherein the physical action is not an activity that causes the customer to interact with an electronic device user interface, wherein tracking the physical action comprises:
  communicating with a sensor positioned within a location of the real-world shopping venue, wherein the sensor wirelessly communicates with a customer mobile device of the customer,
  obtaining, via the communications between the processing device and the sensor, data indicating one or more of (i) the customer mobile device having communicated with the sensor at a first time and a second time and (ii) movement of an object within the location, and
  determining that the physical action occurred based on one or more of (i) the first time and the second time indicating a threshold duration of the customer mobile device being positioned at the location and (ii) the movement of the object within the location;
identifying a support person to provide assistance to the customer based on the tracked physical action and the location of the support person, wherein identifying the support person comprises:
  accessing a data structure that associates mobile devices of support personnel with locations within the real-world shopping venue,
  matching the location to one of the locations in the data structure, and
  outputting an identifier of the support person based on the matching;
determining that the support person from the outputted identifier is an additional customer having a support mobile device that is present at the real-world shopping venue who has consented to provide support in exchange for an incentive;
configuring, while the customer mobile device is in the location, the customer mobile device to display an interface prompting for authorization to contact the support person; and
configuring, responsive to receiving the authorization via the interface, a telecommunication server to transmit, to the support mobile device of the support person, a notification having information about the location of the customer within the real-world shopping venue.

9. The system of claim 8, the operations further comprising configuring, responsive to receiving the authorization via the interface, the interface on the support mobile device and on the customer mobile device to initiate a live chat between the support person and the customer.

10. The system of claim 8, wherein the sensor positioned within the location the real-world shopping venue comprises a beacon, Radio Frequency Identification (RFID) device, or Near Field Communication (NFC) device,
  wherein the system is configured for determining a customer location by selecting, as the customer location, a location of the beacon, RFID device, or NFC device during communication with the customer mobile device.

11. The system of claim 8, wherein the system further comprises:
  an accelerometer configured for generating movement data indicating a movement of the particular product in the location; and
  a beacon configured for wirelessly communicating with the customer mobile device and the processing device;
  wherein the processing device is further configured for:
    determining, from communications with the beacon at the first time and the second time, that the customer mobile device is in the location for a threshold amount of time;
    determining, from the movement data, the movement of the particular product in the location; and
    attributing the physical action involving interaction the particular product to the customer based on the movement data indicating the movement of the particular product during a time period in which the customer is determined to be in the location.

12. The system of claim 8, wherein identifying the support person comprises:
  identifying an area of expertise based on the tracked physical action;
  accessing a data structure containing associations between one or more potential support persons and one or more areas of expertise; and
  determining that the support person is associated with the area of expertise based on the tracked physical action.

13. The system of claim 8, the operations further comprising:
  configuring, responsive to receiving the authorization via the interface, a telecommunication server to transmit, to the support mobile device of the support person, context information comprising information about online interactions and information about customer actions in the real-world shopping venue.

14. The system of claim 13 wherein the context information identifies one or more of:
  a section of the real-world shopping venue where the customer is present;
  a related section of the real-world shopping venue that the customer previously visited;
  a competitor brand of a product that the customer interacted with at the real-world shopping venue;
  cross selling information; or
  features of a product or category in which the customer is determined to be interested based on an eye tracking sensor.

15. A non-transitory computer-readable medium having program code that is stored thereon, the program code executable by one or more processing devices for performing operations comprising:
  tracking a physical action of a customer present at a real-world shopping venue, wherein the physical action is not an activity that causes the customer to interact with an electronic device user interface, wherein tracking the physical action comprises:
    communicating with a sensor positioned within a location of the real-world shopping venue, wherein the sensor wirelessly communicates with a customer mobile device of the customer,
    obtaining, via the communications between the processing device and the sensor, data indicating one or more of (i) the customer mobile device having communicated with the sensor at a first time and a second time and (ii) movement of an object within the location, and
    determining that the physical action occurred based on one or more of (i) the first time and the second time indicating a threshold duration of the customer mobile device being positioned at the location and (ii) the movement of the object within the location;

identifying a support person to provide assistance to the customer based on the tracked physical action and the location of the support person, wherein identifying the support person comprises:
   accessing a data structure that associates mobile devices of support personnel with locations within the real-world shopping venue, matching the location to one of the locations in the data structure, and outputting an identifier of the support person based on the matching;
determining that the support person from the outputted identifier is an additional customer having a support mobile device that is present at the real-world shopping venue who has consented to provide support in exchange for an incentive;
configuring, while the customer mobile device is in the location, the customer mobile device to display an interface prompting for authorization to contact the support person; and
configuring, responsive to receiving the authorization via the interface, a telecommunication server to transmit, to the support mobile device of the support person, a notification having information about the location of the customer within the real-world shopping venue.

16. The non-transitory computer-readable medium of claim 15, the operations further comprising configuring, responsive to receiving the authorization via the interface, the interface on the support mobile device and on the customer mobile device to initiate a live chat between the support person and the customer.

17. The non-transitory computer-readable medium of claim 15, wherein the sensor comprises an accelerometer and a beacon positioned on a particular product, wherein tracking the physical action further comprises:
   determining, from communications with the beacon at the first time and the second time, that the customer mobile device is in the location for a threshold amount of time;
   determining, movement data generated by the accelerometer, a movement of the particular product in the location, wherein the processing device obtains the movement data via wireless communication with the accelerometer; and
   attributing, by the processing device, the physical action involving interaction the particular product to the customer based on the movement data indicating the movement of the particular product during a time period in which the customer is determined to be in the location.

18. The non-transitory computer-readable medium of claim 15 wherein identifying the support person comprises:
   identifying an area of expertise based on the tracked physical action;
   accessing a data structure containing associations between one or more potential support persons and one or more areas of expertise; and
   determining that the support person is associated with the area of expertise based on the tracked physical action.

19. The non-transitory computer-readable medium of claim 15, the operations further comprising:
   configuring, responsive to receiving the authorization via the interface, a telecommunication server to transmit, to the support mobile device of the support person, context information comprising information about online interactions and information about customer actions in the real-world shopping venue.

20. The non-transitory computer-readable medium of claim 19 wherein the context information identifies one or more of:
   a section of the real-world shopping venue where the customer is present;
   a related section of the real-world shopping venue that the customer previously visited;
   a competitor brand of a product that the customer interacted with at the real-world shopping venue;
   cross selling information; or
features of a product or category in which the customer is determined to be interested based on an eye tracking sensor.

* * * * *